C. W. CORNELL.
Car-Coupling.
No. 210,451.  Patented Dec. 3, 1878.
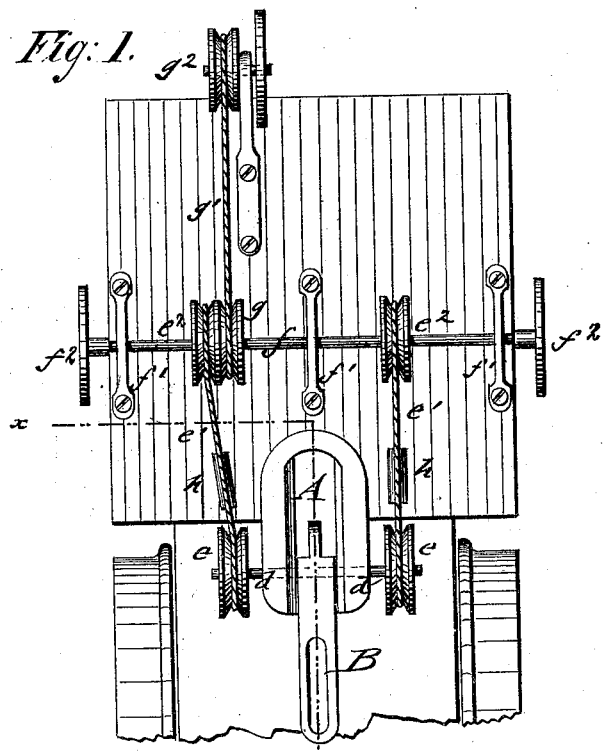
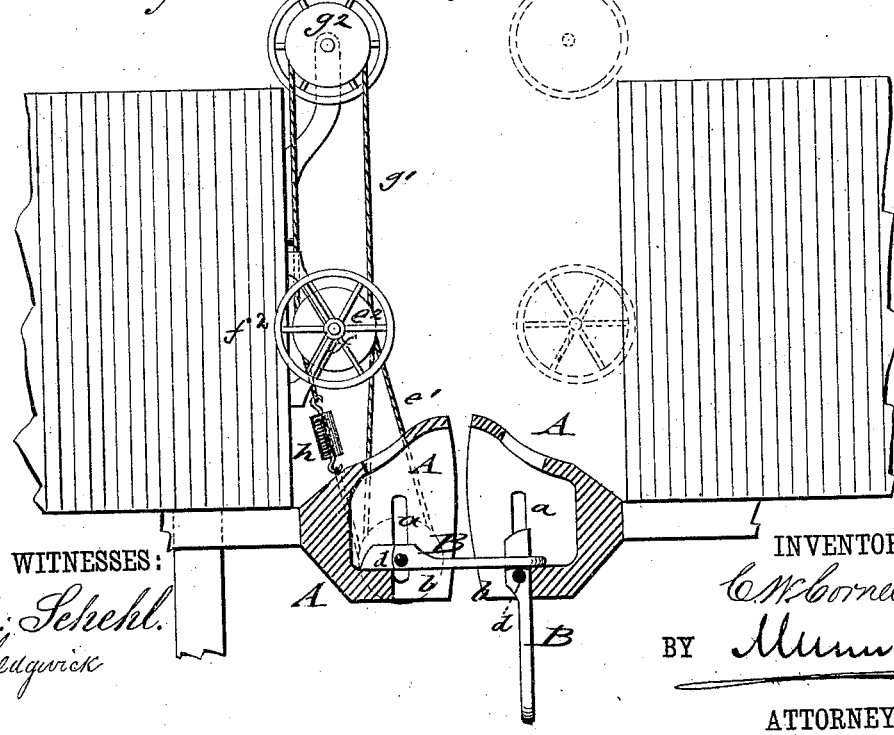
WITNESSES:
A. Schehl.
C. Sedgwick
INVENTOR:
C. W. Cornell
BY Munn & Co.
ATTORNEYS.

UNITED STATES PATENT OFFICE.

CHARLES W. CORNELL, OF WAUSEON, OHIO.

IMPROVEMENT IN CAR-COUPLINGS.

Specification forming part of Letters Patent No. 210,451, dated December 3, 1878; application filed September 27, 1878.

*To all whom it may concern:*

Be it known that I, CHARLES W. CORNELL, of Wauseon, in the county of Fulton and State of Ohio, have invented a new and Improved Car-Coupling, of which the following is a specification:

In the accompanying drawings, Figure 1 represents an end elevation of a car with my improved coupling, and Fig. 2 a vertical longitudinal section of the same on line $x\ x$, Fig. 1.

Similar letters of reference indicate corresponding parts.

This invention relates to an improved automatic car-coupling that may be coupled without going in between the cars, the coupling-link being held in the exact position for entering the connecting draw-head, and adapted to couple with draw-heads of cars of different heights.

The invention consists of a draw-head having vertical side slots, in which is guided the fixed cross-pin of a combined coupling hook and link. To the extended cross-pin are applied pulleys, which connect by endless chains and intermediate compensating-springs with pulleys of a transverse shaft, turning in bearings of the car, and by a second chain with a top pulley and shaft, so that the coupling hook and link may be operated from either side or the top of the car.

Referring to the drawings, A represents a draw-head, that is supported and cushioned in the customary manner. The draw-head is elongated vertically, so as to be higher than the common form of draw-heads. The side walls of the draw-head have vertical slots $a$ and a bottom or front recess, $b$, for the combined coupling hook and link B. This combined hook and link is keyed to a cross pin or shaft, $d$, that passes sidewise through the slots $a$, the hook-shaped portion extending at one side and the link-shaped portion at the other side of the cross-pin.

To the outer ends of the cross pin or shaft $d$ are applied pulleys $e$, which are connected by chains or belts $e^1$, attached thereto, with pulleys $e^2$ of a transverse shaft, $f$, that is supported in bearings of brackets $f^1$ of the car.

At the outer ends of the transverse shaft are hand-wheels $f^2$, by which the shaft may be turned in either direction, so as to swing up or drop down, and raise or lower the combined coupling hook and pin B.

The transverse shaft $f$ is again connected, by a pulley, $g$, and belt or chain $g^1$, with a pulley and hand-wheel shaft, $g^2$, supported at the top of the car, so that the hook and link can be operated at will from the side or top.

The lower chains are provided with a compensating-spring arrangement, $h$, that consists of a sliding rod guided in a cylindrical casing or box and cushioned by a spiral spring.

The compensating-springs keep the chains taut and exert also an axial strain on the link, so as to impart a downward motion and keep it reliably in coupled position on the hook end of the link of the connecting draw-head.

For coupling the cars, the hand-wheels of the side or top shaft are turned back, and thereby the coupling-link is first swung into horizontal position, and then moved along the vertical side slots of the draw-head into position to couple with a draw-head of any height.

The coupling-link enters by the approach of the car into the cavity of the opposite draw-head and passes over the upwardly-projecting hook end of the pendent coupling-link of that draw-head, so as to drop back of the same and couple it. In case of a draw-head with a common pin, the coupling-link is coupled in the customary manner.

When the link is swung into horizontal position the hook end bears on the bottom or shoulder of the draw-head, as shown in Fig. 2. Whatever be the position of the hook and link when at rest, the whole weight is thrown on the back chains.

For uncoupling, the link is first raised above the hook end of the connecting-link, and then dropped into vertical position as soon as it clears the opposite draw-head by letting the actuating top or side shaft go.

The coupling and uncoupling of the cars are thus accomplished easily and without the least danger, and the coupling adapted to couple with cars of different height and with cars having the common pin-and-link coupling.

I am aware that it is not new to hold a coupling-bar in a draw-head by a swinging gate, operated from top or either side of car, or to use a link with hook projection; but I so arrange my cross-pin that the link, when in a reclining position, is held to the center of draw-head until elevated to a horizontal position, and then raised to a higher or depressed to a lower position to accommodate itself to the approaching draw-head, the link being thus rendered capable of swinging laterally to couple on a curved as well as a straight track.

Having thus described all that is necessary to a full understanding of my invention, what I claim as new is—

The combination, in a car-coupling, of a draw-head having vertical side slots $a\ a$ and the hook and link B, having a fixed cross-pin, $d$, the latter passing through said slots, as and for the purpose specified.

CHARLES WESLEY CORNELL.

Witnesses:
C. E. GUILFORD,
J. AUXTER.